United States Patent [19]
Haegens et al.

[11] Patent Number: 5,275,829
[45] Date of Patent: Jan. 4, 1994

[54] METHOD OF MAKING CRACKERS HAVING A BREAD-LIKE TASTE

[75] Inventors: Noel Haegens, Parma; Stefano Righi, Emilia; Romeo Signani, Parma, all of Italy

[73] Assignee: Barilla G.E.R. F.LLI-Societa per Azioni, Parma, Italy

[21] Appl. No.: 767,778

[22] Filed: Sep. 30, 1991

[51] Int. Cl.$^5$ .............................. A21D 8/00
[52] U.S. Cl. ........................ 426/19; 426/20; 426/27
[58] Field of Search ............... 426/19, 20, 27, 120, 426/128, 129

[56] References Cited

U.S. PATENT DOCUMENTS

| | | |
|---|---|---|
| 1,646,921 | 10/1972 | Loose . |
| 3,620,173 | 11/1971 | Sternberg .............. 426/18 |
| 4,734,289 | 3/1988 | Yamaguchi et al. ........ 426/242 X |
| 5,066,499 | 11/1991 | Arciszewski et al. ........ 426/19 |

FOREIGN PATENT DOCUMENTS

| | | |
|---|---|---|
| 0180727 | 5/1986 | European Pat. Off. . |
| 2640470 | 6/1990 | France . |
| 007783 | 3/1973 | Japan . |
| 255103 | 3/1964 | Netherlands . |

OTHER PUBLICATIONS

Bohn, Biscuit and Cracker Production, 1957, American Trade Publishing Co.: New York, pp. 92-109.
Cereal Chemistry, vol. 62, No. 3, Jun. 1985, Salem, Mass., pp. 158-162 Doescher et al., "Saltine Crackers: Changes in Cracker Sponge Rheology and Modification of a Cracker-Baking Procedure."

Primary Examiner—Joseph Golian
Attorney, Agent, or Firm—Sughrue, Mion, Zinn, Macpeak & Seas

[57] ABSTRACT

A cracker having a bread-like taste is formed from a dough for crackers which incorporates an aqueous suspension of a mixture of flour and yeast and a fermented mixture comprising flour and yeast.

3 Claims, 1 Drawing Sheet

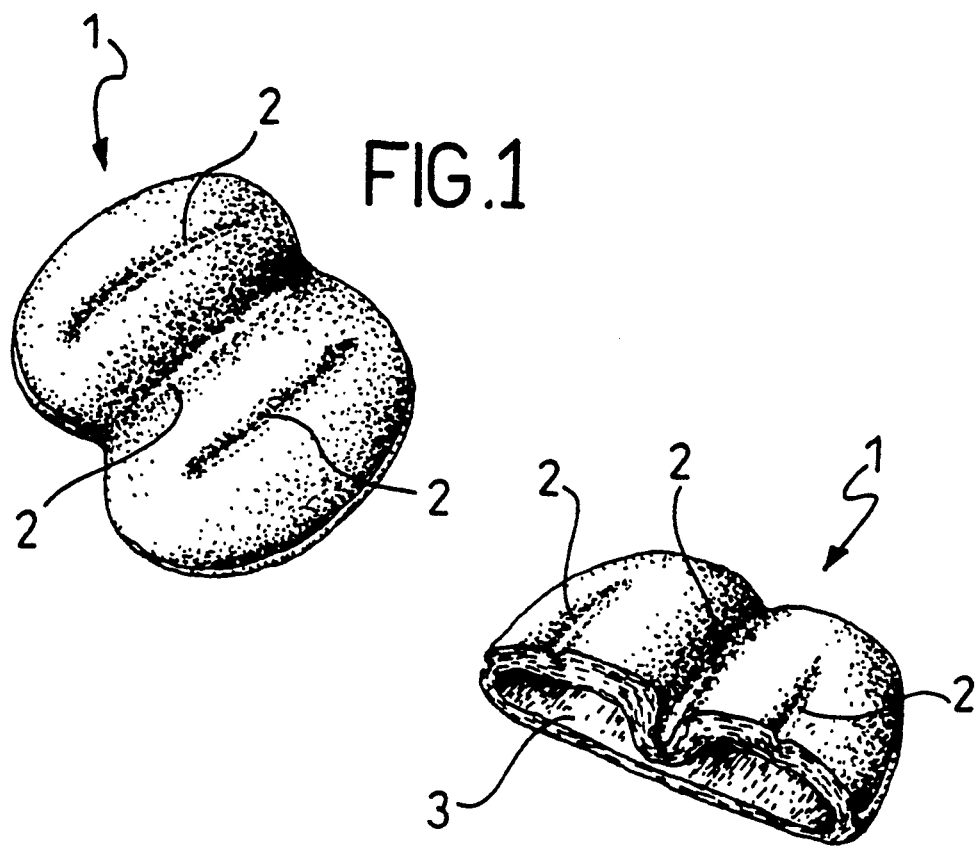

METHOD OF MAKING CRACKERS HAVING A BREAD-LIKE TASTE

BACKGROUND OF THE INVENTION

This invention relates to a cracker tasting bread-like.

The invention also relates to a method of making such a cracker type.

It is a well-known fact that crackers are typical bakery consumables, mainly made and packaged today by industrial methods.

Also known is that crackers are specially valued on account of their low moisture content, which makes them crisp and crumbly, as well as adapted for long-term preservation.

While such features are much appreciated, conventional crackers are not appreciated by all because they are usually lacking in fragrance. Although providing an alternative choice to bread, crackers are never so well accepted as real bread.

SUMMARY OF THE INVENTION

It is the object of this invention to provide a cracker type which has such organoleptic characteristics as to be regarded as a product with the typical taste and flavor of bread, which also resembles bread visually while retaining the appearance of a cracker.

This object is achieved by a cracker characterized in that it is formed from a dough for crackers, which includes an aqueous suspension of a mixture of flour and yeast and a fermented mixture made up of flour and yeast.

In a preferred embodiment, this cracker is formed with crosswise cuts effective to promote swelling thereof while being baked.

The invention also concerns a method of making crackers tasting bread-like, characterized in that it comprises the steps of incorporating in a dough for crackers an aqueous suspension of a mixture of flour and yeast and a fermented mixture comprising flour and yeast, allowing said dough to ferment for a short time period at ambient temperature (23°–26° C.) under an atmosphere at a high relative humidity, conventionally obtaining cracker preforms from said dough, subjecting said cracker preforms to a heat treatment of quick baking to promote controlled swelling thereof, and baking to completion by means of microwaves.

The features and advantages of a cracker according to the invention will become apparent from the following detailed description of an embodiment thereof, given by way of illustration and not of limitation with reference to the accompanying drawing.

BRIEF DESCRIPTION OF THE DRAWINGS

In the drawing:

FIG. 1 is a perspective view of a cracker produced in accordance with the invention; and FIG. 2 is a further perspective view of a cracker produced in accordance with this invention.

DETAILED DESCRIPTION OF THE INVENTION

With reference to the drawing figures, generally shown at 1 is a cracker produced in accordance with this invention.

This cracker 1 is formed from a dough for crackers which incorporates an aqueous suspension of a mixture of flour and yeast.

Specifically, a mixture is prepared which comprises flour and yeast with salt added.

The basic ingredient of the mixture is composed of flour in the proportion of 76% by weight, the yeast being present in the by-weight proportion of 22%. These ingredients are admixed with a salt proportion amounting to no more than 2% by weight, using a mixer of conventional design.

Said mixture can be stored in sacks of a selected weight, e.g. 50 kg.

Approximately 24 hours before use, an aqueous suspension is prepared of said mixture.

Into a two-speed mixer, not shown because conventional, there are put a predetermined amount of water at a temperature of 15° C. and a corresponding amount of the aforesaid mixture comprising flour, yeast and salt. To this aim, the mixer is equipped with a process vessel having a jacket through which cooling water at 4° C. is circulated.

The mixer is first operated at its high sped setting for about 30 minutes, and then at its low speed setting until the mixture is fully suspended.

At this stage, a substantially whey-like suspension is yielded which is used, in accordance with the invention, as an ingredient in a dough for crackers in a proportion to be specified.

In addition, according to the invention, the said dough for crackers incorporates a fermented mixture comprising flour and yeast.

Specifically, the basic ingredient for this additional mixture is composed of flour, in the proportion of 85% by dry weight, with the yeast being present in the proportion of 10.7% by dry weight.

These ingredients are mixed at a high speed, for about 4 minutes, in a mixer of a type known in the trade as TONELLI. The addition of a 3.2% by-weight proportion of malt extract and an amount of a proteolytic enzyme, protease is also contemplated.

The resulting suspension is allowed to ferment inside a fermentation cell for about 30 minutes, at 23°–26° C., under an atmosphere at 80–85% relative humidity.

At this stage, the yield is a fermented mixture which is used according to the invention as an ingredient of the dough for crackers, in a proportion to be specified.

A first step of the inventive method consists of incorporating in a dough for crackers, known per se, the aforesaid mixture comprising flour and yeast as its basic ingredients.

The dough ingredients are mixed in a mixer for about 6 minutes with 7% by weight of water, 1.2% of salt and 0.6% of malt extract.

Thereafter, the whey-like suspension, as previously described is added to the starting dough and the other ingredients, listed herein below along with their percentages by weight:

Flour: 61.2%
Margarine: 8.6%
Lard: 0.6%
Whey-like suspension: 9.2% plus minor amounts of sodium bicarbonate, cream of tartar, and maize starch.

The mixing step is carried out in a vertical mixer and continued for just 4-6 minutes.

The subsequent step of the method involves fermentation of the dough in a standby vat for about 3 hours.

The dough is allowed to ferment at ambient temperature (23°-26° C.) under an atmosphere at fairly high relative humidity, in the order of 80-85%.

Portions of the dough, having a predetermined weight, are supplied in succession to a crackers processing line which is quite conventional in design except for its inlet portion, which comprises a two-high vertical rolling stand.

Downstream from said line, a sheet of dough is delivered from which cracker preforms are prepared using a dual, molding and cutting die.

The cracker preforms are provided with three crosswise-extending cuts 2, effective to promote controlled swelling of the same during the next baking step.

A further step of the method according to the invention consists of subjecting the cracker preforms to a heat treatment of quick baking to promote the above-mentioned swelling.

The baking time is of only 5-6 minutes, enough to impart to the cracker the crowned shape shown in the drawing.

This baking step with heat treatment, maintained for a comparatively short time, only provides the cracker with a pale color.

The method provides for baking to completion, in order to adjust the moisture content in the product. Advantageously, in order to retain the aforesaid characteristic color, this additional baking step is carried out for a few seconds under an RF (microwave) unit.

At the end of the last process step, the crackers are ready for packaging.

The method of this invention yields a product which has the typical taste of bread. In addition, the crackers obtained thereby resemble bread visually as well, since they show a cavity 3 in cross-section, as against the flattish shape that typifies crackers made with conventional methods.

We claim:

1. A method of making crackers having a bread-like taste comprising the steps of:

preparing a cracker dough;

mixing a mixture comprised of 85% by dry weight flour and 10.7% by dry weight yeast, forming a suspension, fermenting for about 30 minutes at 23°-26° C. under an atmosphere of 80-85% relative humidity, and adding said mixture to said dough for crackers to provide an intermediate dough;

mixing a whey-like suspension comprising flour, yeast, salt and water with said intermediate dough to provide a final dough said whey-like suspension is comprised of an aqueous suspension of a mixture comprising flour in a by-weight proportion of 76%, yeast in a by-weight proportion of 22% and salt in a by-weight proportion of 2%;

allowing the final dough to ferment for a short time period at ambient temperature under an atmosphere at high relative humidity;

making cracker preforms from said final dough;

subjecting said cracker preforms to a heat treatment of quick baking to promote controlled swelling thereof; and baking to completion in a microwave oven.

2. A method as set forth in claim 1, wherein said whey-like suspension is prepared by maintaining said whey-like suspension under agitation for 24 hours at 15° C.

3. A method as set forth in claim 1, further comprising providing the cracker preforms with three crosswise extending cuts and carrying out the baking for 5-6 minutes to provide controlled swelling of the preforms.

* * * * *